(12) United States Patent
Peng

(10) Patent No.: US 11,436,403 B2
(45) Date of Patent: Sep. 6, 2022

(54) ONLINE DOCUMENT COMMENTING METHOD AND APPARATUS

(71) Applicant: TIANJIN BYTEDANCE TECHNOLOGY CO., LTD., Tianjin (CN)

(72) Inventor: Cheng Peng, Beijing (CN)

(73) Assignee: TIANJIN BYTEDANCE TECHNOLOGY CO., LTD., Tianjin (CN)

(*) Notice: Subject to any disclaimer, the term of this patent is extended or adjusted under 35 U.S.C. 154(b) by 0 days.

(21) Appl. No.: 16/980,265

(22) PCT Filed: Nov. 1, 2018

(86) PCT No.: PCT/CN2018/113349
§ 371 (c)(1),
(2) Date: Sep. 11, 2020

(87) PCT Pub. No.: WO2019/205552
PCT Pub. Date: Oct. 31, 2019

(65) Prior Publication Data
US 2021/0027007 A1 Jan. 28, 2021

(30) Foreign Application Priority Data

Apr. 26, 2018 (CN) .......................... 201810387379.4

(51) Int. Cl.
*G06F 3/04817* (2022.01)
*G06F 40/106* (2020.01)

(52) U.S. Cl.
CPC ........ *G06F 40/106* (2020.01); *G06F 3/04817* (2013.01)

(58) Field of Classification Search
CPC .. G06F 40/106; G06F 3/04817; G06F 40/169; G06F 17/00
See application file for complete search history.

(56) References Cited

U.S. PATENT DOCUMENTS

| 9,880,989 B1 * | 1/2018 | Cadabam | ............... G06F 40/169 |
| 2005/0223315 A1 * | 10/2005 | Shimizu | ............... G06F 40/169 |
| | | | 715/230 |

(Continued)

FOREIGN PATENT DOCUMENTS

| CN | 101567065 A | 10/2009 |
| CN | 103617028 A | 3/2014 |

(Continued)

OTHER PUBLICATIONS

International Patent Application No. PCT/CN2018/113349; Int'l Search Report; dated Jan. 30, 2019; 2 pages.

*Primary Examiner* — Ryan F Pitaro
(74) *Attorney, Agent, or Firm* — BakerHostetler

(57) ABSTRACT

The present application provides an online document commenting method and apparatus. In an embodiment of the method, an operation of a user on a display interface is monitored, and a commenting behavior of commenting on a first document is recognized. The format of the first document is acquired when the commenting behavior is recognized, and the format of the first document is determined whether a pre-set format. The format of the first document is converted in order to generate a second document when the format of the first document is not the pre-set format, wherein the format of the second document is the pre-set format. The comment information regarding the second document is received and displayed. By means of the method, it is possible to present comment content to a user having a comment requirement, and not present the comment content to a user having no comment requirement.

15 Claims, 15 Drawing Sheets

(56) References Cited

U.S. PATENT DOCUMENTS

| | | | |
|---|---|---|---|
| 2006/0259524 A1 | 11/2006 | Horton | |
| 2007/0294614 A1* | 12/2007 | Jacquin | G06F 40/169 715/230 |
| 2008/0168073 A1* | 7/2008 | Siegel | G06F 16/58 |
| 2009/0217196 A1* | 8/2009 | Neff | G06F 16/9535 715/799 |
| 2009/0265172 A1* | 10/2009 | Tipton | G10L 13/00 704/260 |
| 2012/0143958 A1 | 6/2012 | Augustine | |
| 2013/0229679 A1* | 9/2013 | Kamath | G06F 3/1285 358/1.15 |
| 2013/0283147 A1* | 10/2013 | Wong | G06Q 10/10 715/234 |
| 2014/0006921 A1* | 1/2014 | Gopinath | G06Q 10/10 715/230 |
| 2014/0032633 A1 | 1/2014 | Kleppner | |
| 2014/0075281 A1* | 3/2014 | Rubin | G06F 40/169 715/230 |
| 2014/0215313 A1* | 7/2014 | Daly | G06F 40/103 715/235 |
| 2014/0289645 A1* | 9/2014 | Megiddo | G06F 3/048 715/753 |
| 2015/0019627 A1* | 1/2015 | Jung | H04L 67/06 709/203 |
| 2015/0074145 A1* | 3/2015 | Homer | G06F 16/93 707/772 |
| 2015/0081681 A1* | 3/2015 | Vohra | G06F 16/38 707/723 |
| 2015/0100876 A1* | 4/2015 | Neugebauer | G06F 40/169 715/233 |
| 2015/0199320 A1* | 7/2015 | Ho | G06F 1/1694 715/233 |
| 2015/0227514 A1* | 8/2015 | Gillett | H04L 63/101 707/608 |
| 2015/0347368 A1* | 12/2015 | Carlen | H04L 51/08 715/230 |
| 2015/0370772 A1* | 12/2015 | Wang | G06F 40/169 715/230 |
| 2016/0092422 A1* | 3/2016 | Maglieri | G06Q 10/101 715/751 |
| 2018/0165255 A1* | 6/2018 | Gafford | G06F 40/174 |
| 2018/0232348 A1* | 8/2018 | Kerr | G06F 40/169 |
| 2018/0253412 A1* | 9/2018 | Biswas | G06F 40/134 |
| 2020/0301951 A1* | 9/2020 | Fox | G06F 40/169 |

FOREIGN PATENT DOCUMENTS

| | | |
|---|---|---|
| CN | 104461490 A | 3/2015 |
| CN | 105654222 A | 6/2016 |
| CN | 107832276 A | 3/2018 |
| CN | 108595646 A | 9/2018 |

* cited by examiner

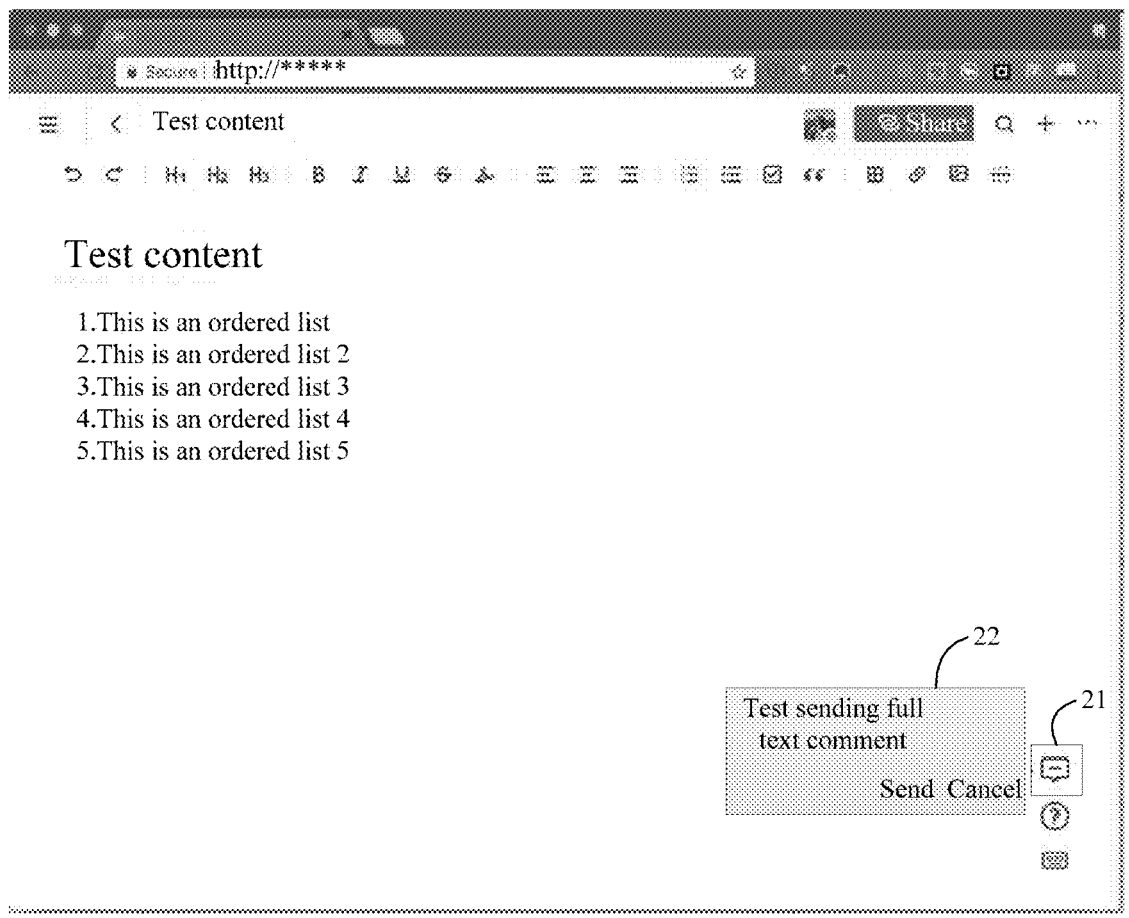
Figure 2（b）

ONLINE DOCUMENT COMMENTING METHOD AND APPARATUS

CROSS-REFERENCE

The present application is the national phase application of International Patent Application No. PCT/CN2018/113349, titled "ONLINE DOCUMENT COMMENTING METHOD AND APPARATUS", filed on Nov. 1, 2018, which claims the priority to Chinese Patent Application No. 201810387379.4, titled "ONLINE DOCUMENT COMMENTING METHOD AND APPARATUS", filed by the applicant "Tianjin Byte Dance Technology Co., Ltd" on Apr. 26, 2018 with the Chinese Patent Office, both of which are incorporated herein by reference in their entireties.

FIELD

The present disclosure relates to the technical field of Internet applications, and in particular to a method and an apparatus for commenting on an online document.

BACKGROUND

Development of internet technologies causes increasingly richness of internet-based applications. Online documents, being an important form of internet applications and extension of conventional desktop word processing applications to internet applications, gradually eliminate the user's dependence on processing software.

The online document application provides users with document editing and viewing functions. Users can write a document online in the online document and share the written online document on the internet for other internet users to read.

SUMMARY

A method and an apparatus for commenting on an online document are provided according to the present disclosure, to provide a commenting function for the online document and improve the flexibility of displaying a comment in the online document.

Therefore, a first object of the present disclosure is to provide a method for commenting on an online document, which includes receiving and displaying comment information when a comment behavior is detected, where the comment information is displayed only after a user comments on the document, in order to provide a commenting function for the online document, and to display the comment information to only the user with commenting needs. The comment information is not displayed to the user without commenting needs, thereby improving the flexibility of displaying a comment in the online document, such that the comment information is displayed in a targeted manner, thereby enhancing the user's reading experience.

A second object of the present disclosure is to provide an apparatus for commenting on an online document.

A third object of the present disclosure is to provide an electronic device.

A fourth object of the present disclosure is to provide a non-transitory computer readable storage medium.

A fifth object of the present disclosure is to provide a computer program product.

To achieve the above objects, a method for commenting on an online document is provided according to an embodiment of a first aspect of the present disclosure. The method includes:

monitoring an operation performed by a user on a display interface, and identifying a commenting behavior for commenting on a first document;

obtaining a format of the first document when the commenting behavior is identified, and determining whether the format of the first document is a preset format;

converting the format of the first document to generate a second document if the format of the first document is not the preset format, wherein a format of the second document is the preset format; and receiving comment information on the second document and displaying the comment information.

With the method for commenting on an online document according to the embodiment of the present disclosure, the commenting behavior for commenting on the first document is identified by monitoring the operation performed by the user on the display interface, the format of the first document is obtained when the commenting behavior is identified, it is determined whether the format of the first document is the preset format, the format of the first document is converted to obtain the second document in the preset format if the format of the first document is not the preset format, then comment information on the second document is received and displayed. Therefore, comment information is received and displayed when the comment behavior is detected, and the comment information is displayed only after the user comments on the document, in order to provide a commenting function for the online document, and to display the comment information to only the user with commenting needs. The comment information is not displayed to the user without commenting needs, thereby improving the flexibility of displaying a comment in the online document, such that the comment information is displayed in a targeted manner, thereby enhancing the user's reading experience.

To achieve the above objects, an apparatus for commenting on an online document is provided according to an embodiment of a second aspect of the present disclosure. The apparatus includes: an identification module, a receiving module, a format conversion module, and a comment display module.

The identification module is configured to monitor an operation performed by a user on a display interface, and identify a commenting behavior for commenting on a first document.

The receiving module is configured to obtain a format of the first document when the commenting behavior is identified, and determine whether the format of the first document is a preset format.

The format conversion module is configured to convert the format of the first document to generate a second document if the format of the first document is not the preset format, wherein a format of the second document is the preset format.

The comment display module is configured to receive comment information on the second document and display the comment information.

With the apparatus for commenting on an online document according to the embodiment of the present disclosure, the commenting behavior for commenting on the first document is identified by monitoring the operation performed by the user on the display interface, the format of the first document is obtained when the commenting behavior is identified, it is determined whether the format of the first document is the preset format, the format of the first document is converted to obtain the second document in the preset format if the format of the first document is not the preset format, then comment information on the second document is received and displayed. Therefore, comment information is received and displayed when the comment behavior is detected, and the comment information is displayed only after the user comments on the document, in order to provide a commenting function for the online document, and to display the comment information to only the user with commenting needs. The comment information is not displayed to the user without commenting needs, thereby improving the flexibility of displaying a comment in the online document, such that the comment information is displayed in a targeted manner, thereby enhancing the user's reading experience.

To achieve the above objects, an electronic device is provided according to an embodiment of a third aspect of the present disclosure. The electronic device includes: a memory, a processor, and a computer program stored in the memory and executable by the processor. When executing the computer program, the processor performs the method for commenting on an online document according to the embodiment of the first aspect of the present disclosure.

To achieve the above objects, a non-transitory computer readable storage medium is provided according to an embodiment of a fourth aspect of the present disclosure. A computer program is stored in the non-transitory computer readable storage medium, and when the computer program is executed by a processor, the method for commenting on an online document according to the embodiment of the first aspect of the present disclosure is performed.

To achieve the above objects, a computer program product is provided according to an embodiment of a fifth aspect of the present disclosure. When instructions in the computer program product are executed by a processor, the method for commenting an online document according to the embodiments of the first aspect of the present disclosure is performed.

Additional aspects and advantages of the present disclosure will partly be presented in the following description, partly become apparent in the following description or be appreciated in practicing of the present disclosure.

BRIEF DESCRIPTION OF THE DRAWINGS

In order to more clearly illustrate the technical solutions according to the embodiments of the present disclosure, one or more embodiments are exemplified in conjunction with accompanying drawings, and these exemplary descriptions do not constitute a limitation to the embodiments, where:

FIG. 2(*b*) is a schematic diagram showing an example of entering comment information in the default comment area;

FIG. 2(*c*) is a schematic diagram showing an example of a display interface of a document after a user makes a comment;

FIG. 2(*d*) is a schematic diagram showing an example of a comment content input box displayed in a document;

FIG. 2(*e*) is a schematic diagram showing an example of inputting comment information in the comment content input box;

FIG. 2(*f*) is a schematic diagram showing an example of displaying existing comment information in a display interface of a document;

FIG. 7(*b*) is a schematic diagram showing an example of a newly added comment area that is hidden;

DETAILED DESCRIPTION OF THE EMBODIMENTS

The technical solution according to the embodiments of the present application will be described clearly and completely as follows in conjunction with the drawings. It is apparent that the described embodiments are only a few rather than all of the embodiments according to the present application. Any other embodiments obtained by those skilled in the field based on the embodiments in the present application without any creative work fall in the scope of the present application.

A method and an apparatus for commenting on an online document according to the embodiments of the present disclosure are described below with reference to the accompanying drawings.

Figure 1:
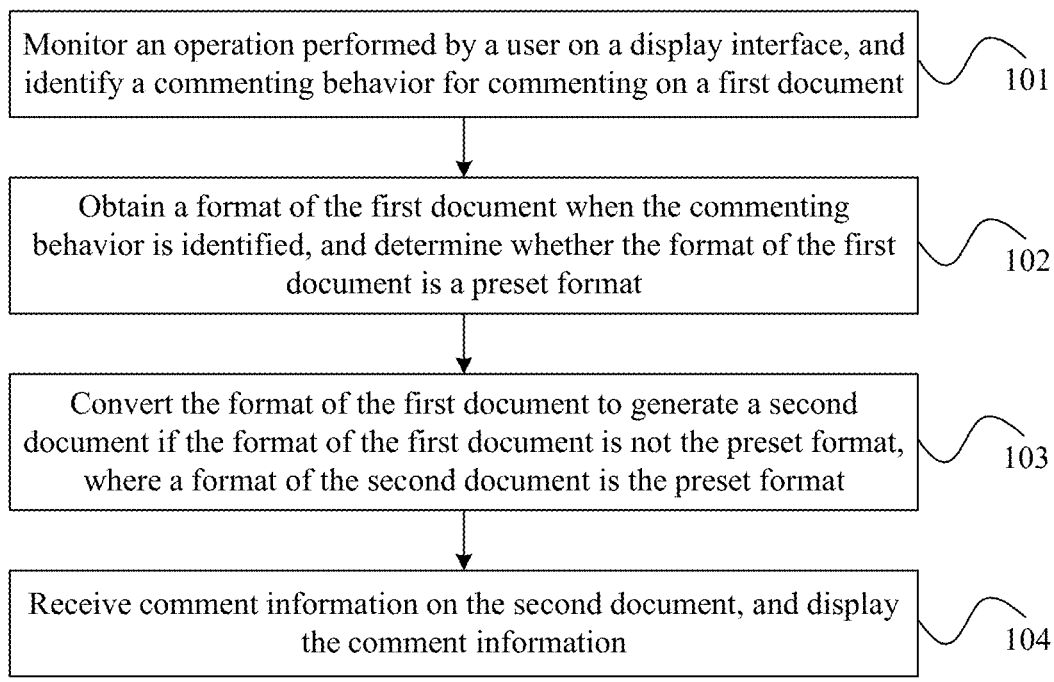
FIG. 1 is a flow chart showing a method for commenting on an online document according to an embodiment of the present disclosure.

FIG. 1 is a flow chart showing a method for commenting on an online document according to an embodiment of the present disclosure. The method may be performed by an electronic device, where the electronic device includes a display screen for displaying an online document, and the electronic device may be, for example, a screen device such as a notebook computer, a tablet computer, or a smart phone.

As shown in FIG. 1, the method for commenting on an online document may include the following steps 101 to 104.

In step 101, an operation performed by a user on a display interface is monitored, and a commenting behavior for commenting on a first document is identified.

The first document may be inputted by a user online or may be an attachment uploaded by the user.

In the embodiment, when a user reads an online article using an electronic device, or writes an online document using the electronic device, the electronic device receives the document that the user wants to read or the user inputs, and displays the received document on the display screen. When the user wants to comment on the document, the user needs to perform an operation on the document displayed on the display interface. In this case, the electronic device may monitor the operation performed by the user on the display interface and identify whether the operation performed by the user is a commenting behavior for commenting on the first document (the document currently displayed on the display interface).

The commenting behavior includes but is not limited to a click operation performed by the user in a comment area of the first document, or operations of selecting content of the first document and adding an annotation performed by the user. The comment area includes a default comment area and a comment area added in a form of an annotation. It should be noted that, in the embodiment, the default comment area is a small icon or a button instead of a large input box in the conventional technology. The default comment area may be arranged at an edge of the first document. For example, the default comment area of the first document is arranged on the lower right corner of the first document, thereby avoiding the problem that the large input box occupies a large area of the online document in the conventional technology.

In a first example, after the electronic device detects a triggering operation by the user to the comment area of the first document, the electronic device determines that the commenting behavior performed by the user for commenting on the first document is identified.

In a second example, after the user selects a part or all of the content of the first document displayed in the display interface of the electronic device and performs an operation of adding an annotation, it is determined that the commenting behavior performed by the user for commenting on the first document is identified.

In step 102, a format of the first document is obtained when the commenting behavior is identified, and it is determined whether the format of the first document is a preset format.

The preset format is an editable text format, such as a .doc format, a .docx format, and a .txt format.

In the embodiment, after identifying that the operation performed by the user is the commenting behavior for commenting on the first document, the electronic device may further obtain the format of the first document, and determine whether the obtained format is the preset format. For example, if the first document is a document inputted by the user online, the electronic device determines that the format of the first document is the preset format; and if the first document is an attachment uploaded by the user, the electronic device may first obtain a type of the attachment, and then determine whether the first document is in the preset format based on the type of the attachment.

In step 103, if the format of the first document is not the preset format, the format of the first document is converted to generate a second document, where a format of the second document is the preset format.

In the embodiment, after obtaining the format of the first document, the electronic device may determine, based on the format of the first document, whether to perform format conversion on the first document. If the obtained format of the first document is an editable text format such as a .doc format or a .txt format, it is determined that the format of the first document is the preset format, and no format conversion is required; and if the obtained format of the first document is a non-editable format, such as a .pdf format, or a .caj format, or the first document is an attachment uploaded by the user, such as a picture, an audio file, or a word document, it is determined that the format of the first document is not the preset format, and format conversion is required to be performed on the first document to generate the second document in the preset format.

In the embodiment, when performing format conversion on the first document to generate a second document, a conversion manner matching the format of first document may be selected according to the format of the first document. Specifically, if the format of the first document is an image format, optical character recognition (OCR) is performed on the first document, and the second document is generated by using a recognition result; if the format of the first document is an audio format, speech recognition is performed on the first document, and the second document is generated by using a recognized text; and if the format of the first document is a non-editable text format, text format conversion is performed on the first document, to generate the second document.

For example, if the format of the first document is a .pdf format, the first document in the .pdf format may be converted into the second document in a .doc format by using a pdf-to-word converter. As another example, if the format of the first document is a .caj format, the first document in the .caj format may be converted into the second document in a .doc format by using a caj-to-word converter.

It should be noted that, since the format of the second document is the preset format, if the format of the first document received by the electronic device is the preset format, no format conversion is required, and the first document is used as the second document. That is, the second document in this step may be generated by performing format conversion on the first document which is not in the preset format, or may be the first document which is in the preset format.

In step 104, comment information on the second document is received, and the comment information is displayed.

In the embodiment, after performing format conversion on the first document which is not in the preset format to obtain the second document in the preset format, the electronic device may receive comment information inputted by a user for commenting on the second document, and display the comment information.

Figure 2:
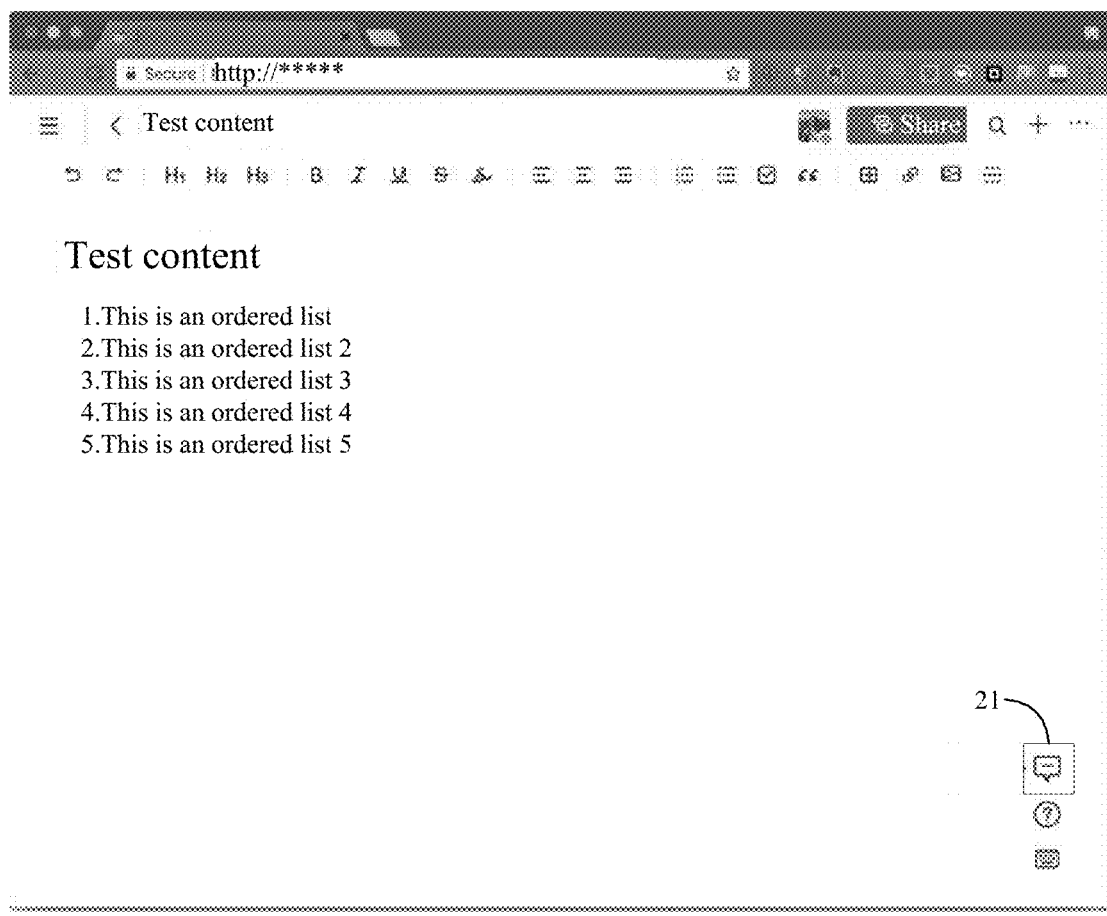
FIG. 2(*a*) is a schematic diagram showing an example of setting a default comment area on a display interface of a document.
Figure 2:
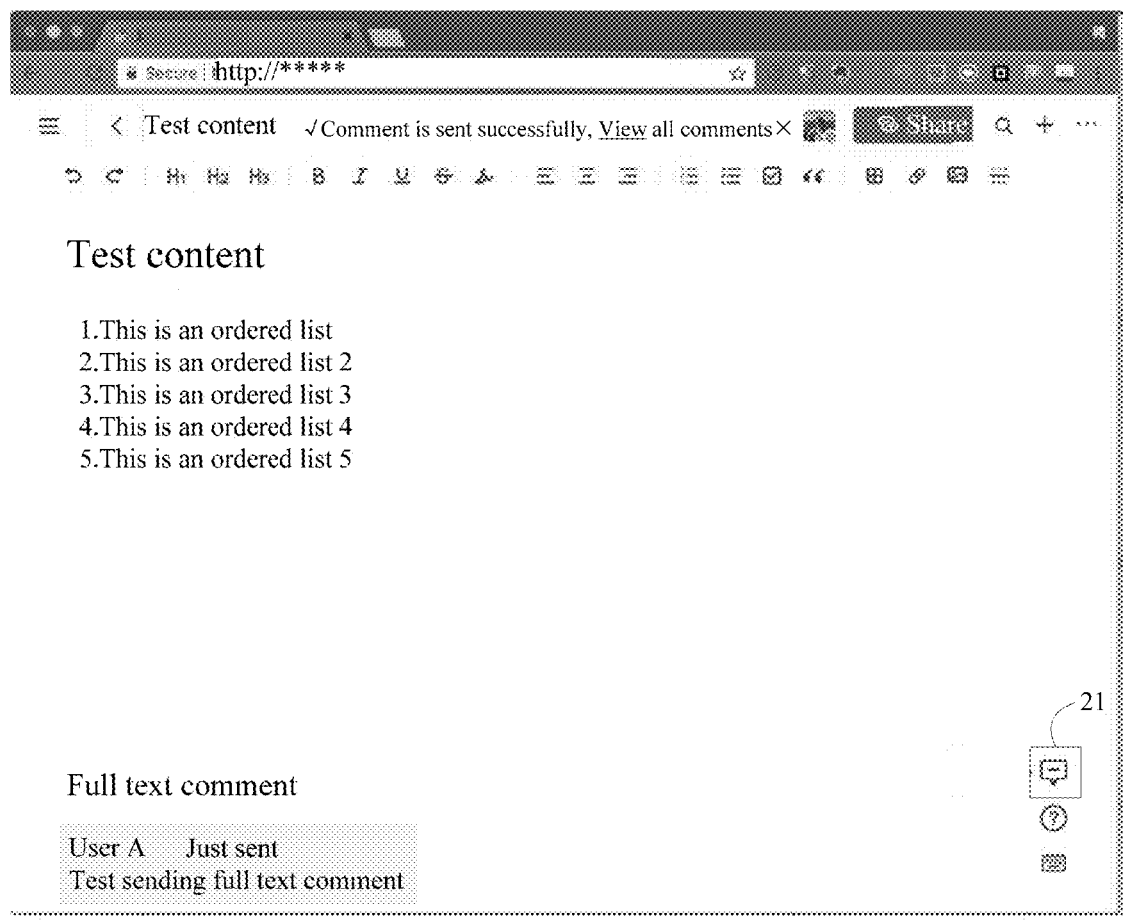
Figure 2:
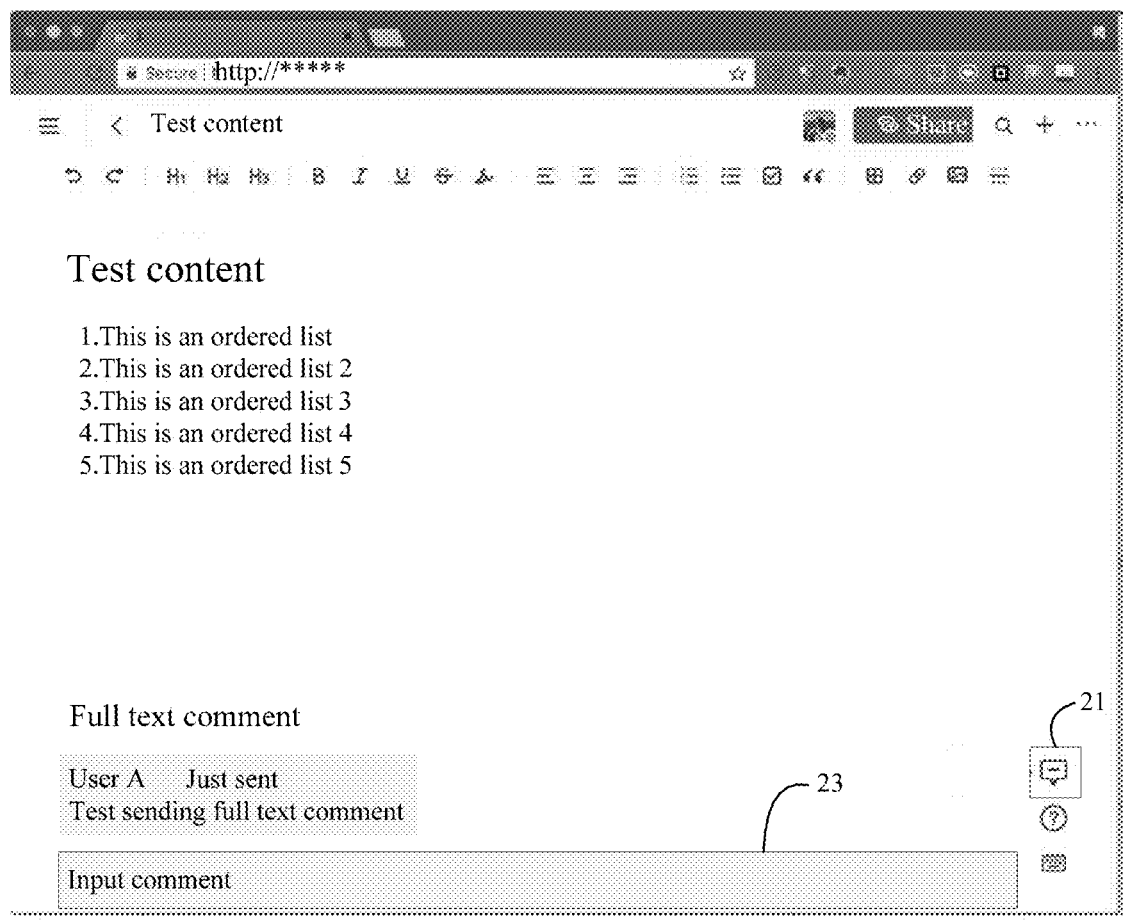
Figure 2:
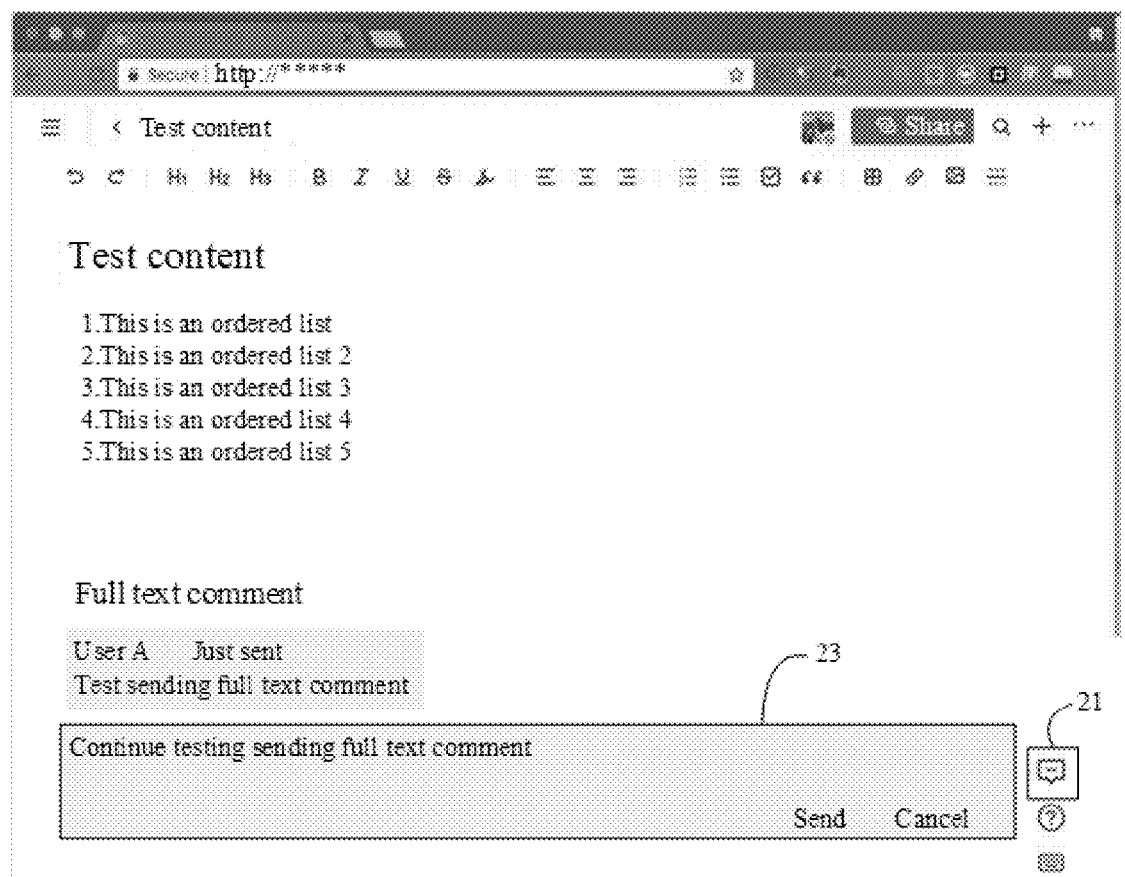
Figure 2:
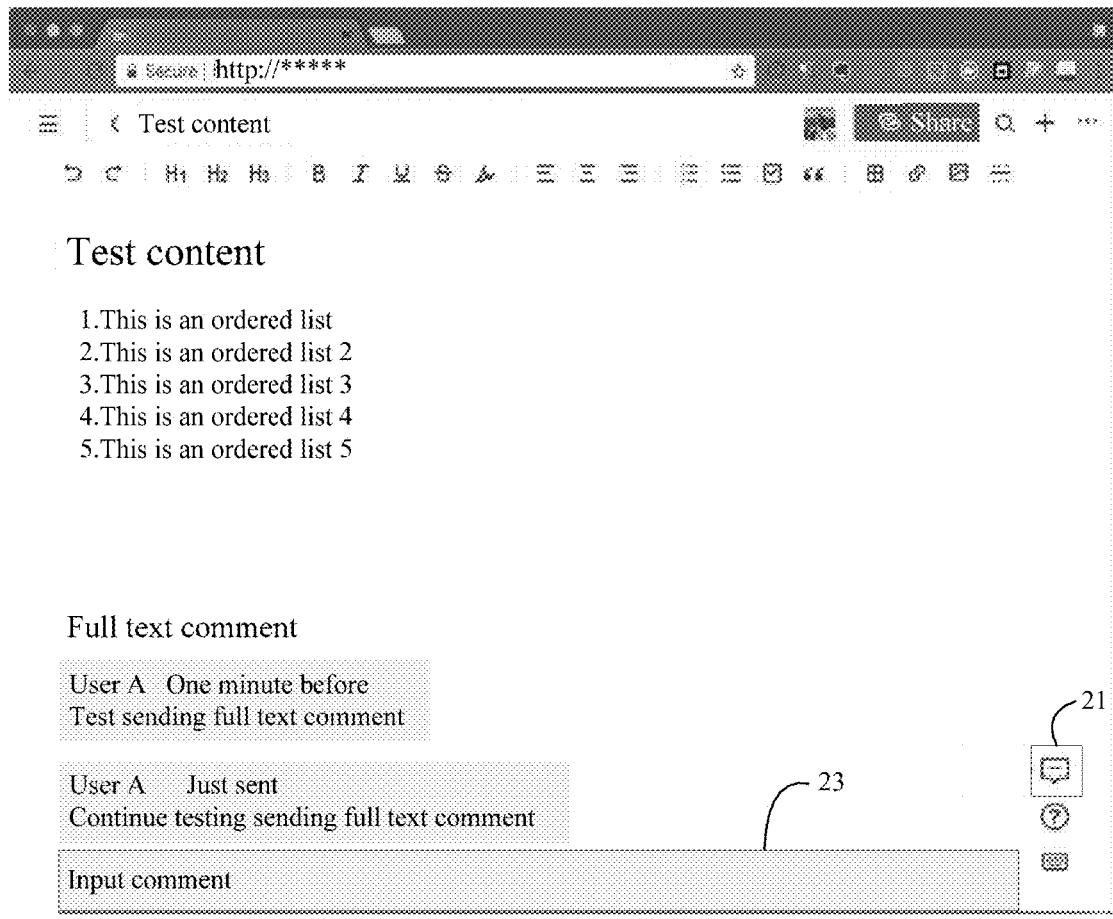

For example, a user comments on the second document using a default comment area. Assuming that a user A is using a tablet computer to write a document titled "Test content", as shown in FIG. 2(a), the content of the document is directly inputted by the user, and no format conversion is required. As shown in FIG. 2(a), a comment area 21 for commenting on the full text is provided on the lower right corner of the document. When the user wants to comment on the document, the user may click the comment area 21, then, as shown in FIG. 2(b), a comment content input area 22 is displayed on the left side of the comment area 21, and the user may input comment content for the document in the comment content input area 22. As shown in FIG. 2(b), when the user inputs comment content in the comment content input area 22, two options of "Send" and "Cancel" is displayed in the comment content input area 22. After completing the input, the user may click the "Send" option to complete the comment; and the user may click the "Cancel" option to clear the comment content inputted by the user or hide the comment content input area 22. For example, after the user A inputs comment content "Test sending full text comment" in the comment content input area 22, and clicks the "Send" option, a prompt message " ✓ Comment is sent successfully, View all comments ✗ " is popped up at the top of the document, and the comment content sent by the user is displayed at the bottom of the document, as shown in FIG. 2(*c*). If the user clicks the "✗", the prompt message disappears; and if the user A wants to view all comments on the document, the user A may click the "View" in the prompt message displayed at the top of the document, and after the user A clicks the "View", all comments on the document are displayed at the bottom of the document.

Further, in a possible implementation of an embodiment of the present disclosure, after the comment content for the document is displayed at the bottom of the document, a comment content input box may be displayed below the comment content, such that the user may send comment content for the document or make new comments on existing comments. As shown in FIG. 2(*d*), a comment content input box 23 is displayed below the existing comment content. When the user A inputs content in the comment content input box 23, as shown in FIG. 2(*e*), two options of "Send" and "Cancel" is displayed in the comment content input box 23. After completing the input, the user A clicks the "Send" option, the comment content "Continue testing sending full text comment" inputted by the user A is displayed below the existing comment, as shown in FIG. 2(*f*).

With the method for commenting on an online document according to the embodiment, the commenting behavior for commenting on the first document is identified by monitoring the operation performed by the user on the display interface, the format of the first document is obtained when the commenting behavior is identified, it is determined whether the format of the first document is the preset format, the format of the first document is converted to obtain the second document in the preset format if the format of the first document is not the preset format, then comment information on the second document is received and displayed. Therefore, comment information is received and displayed when the comment behavior is detected, and the comment information is displayed only after the user comments on the document, in order to provide a commenting function for the online document, and to display the comment information to only the user with commenting needs. The comment information is not displayed to the user without commenting needs, thereby improving the flexibility of displaying a comment in the online document, such that the comment information is displayed in a targeted manner, thereby enhancing the user's reading experience.

Figure 3:
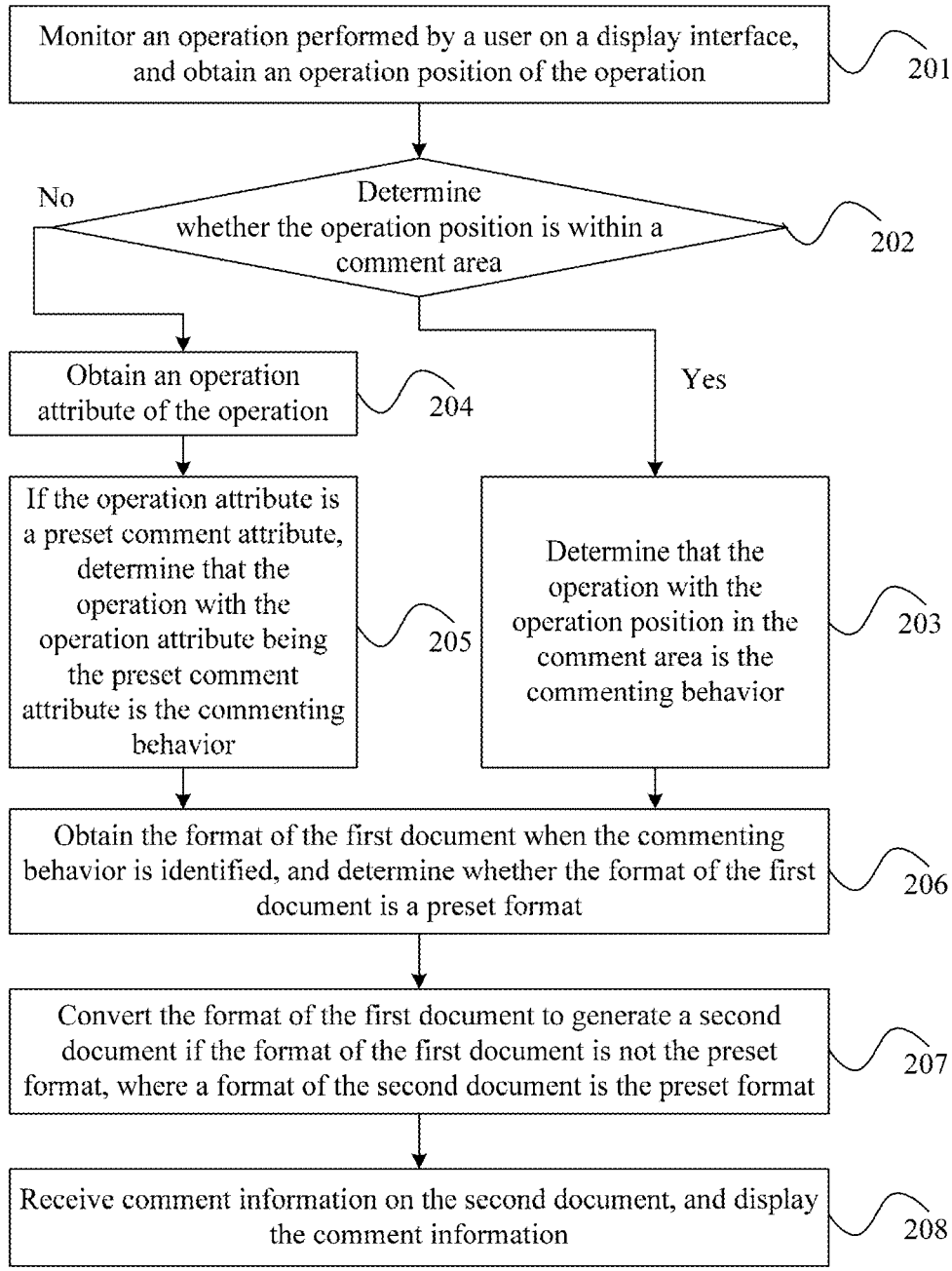
FIG. 3 is a flow chart showing a method for commenting on an online document according to another embodiment of the present disclosure.

FIG. 3 is a flow chart showing a method for commenting on an online document according to another embodiment of the present disclosure.

As shown in FIG. 3, the method for commenting on an online document may include the following steps 201 to 208.

In step 201, an operation performed by a user on a display interface is monitored, and an operation position of the operation is obtained.

The operation position may be a position where the operation is triggered by the user using a mouse, and in this case the operation position of the operation may be determined by tracking click events of the mouse. Alternatively, the operation position may be a position where the operation is triggered by the user using a stylus, or a position where the operation is performed by the user with a finger on a touch screen, and in these cases the operation position of the operation may be determined by detecting a change in capacitance of the touch screen.

In step 202, it is determined whether the operation position is within a comment area.

The comment area includes a default comment area and a comment area added in a form of an annotation. The default comment area has a fixed position, such as on the lower right corner of a document.

In the embodiment, if the obtained operation position of the operation performed by the user is within a range of the default comment area, or the obtained operation position coincides with a position of an added annotation, it is determined that the operation position is within the comment area, and step 203 is performed; otherwise, it is determined that the operation position is outside the comment area, and step 204 is performed.

In step 203, it is determined that the operation with the operation position in the comment area is the commenting behavior.

In the embodiment, if the operation position is within the comment area, it is determined that the operation is the commenting behavior, a format of the first document is obtained, and it is determined whether the format of the first document is a preset format, that is, step 206 is performed.

In step 204, an operation attribute of the operation is obtained.

The operation attribute may be a type of the operation, for example, an operation on a text. The operation attribute may be, for example, highlighting, bolding, and adding an annotation.

In the embodiment, if the operation position is not within the comment area, the operation attribute of the operation may be obtained to determine whether the current operation is the commenting behavior based on the operation attribute.

In step 205, if the operation attribute is a preset comment attribute, it is determined that the operation with the operation attribute being the preset comment attribute is the commenting behavior.

The preset comment attribute includes adding an annotation.

In the embodiment, if the obtained operation position of the operation performed by the user is not within the comment area, the operation attribute of the operation may be obtained, and if the operation attribute is the preset comment attribute, it is determined that the operation with the operation attribute being the preset comment attribute is the commenting behavior.

For example, if the obtained operation attribute of the operation currently performed by the user is adding an annotation, and the operation attribute coincides with the preset comment attribute, it is determined that the operation currently performed by the user is the commenting behavior.

In step 206, the format of the first document is obtained when the commenting behavior is identified, and it is determined whether the format of the first document is the preset format.

In step 207, if the format of the first document is not the preset format, the format of the first document is converted to generate a second document, where a format of the second document is the preset format.

It should be noted that, one can refer to the description of step 101 and step 102 in the foregoing embodiment for the description of step 206 and step 207 in the embodiment may, and details are not described herein again.

In step 208, comment information on the second document is received, and the comment information is displayed.

Figure 4:
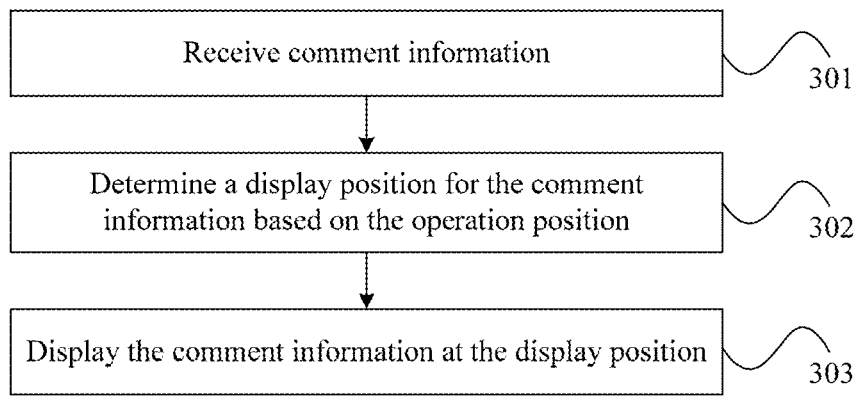
FIG. 4 is a flow chart showing a method for receiving and displaying comment information on a second document according to an embodiment of the present disclosure.

As a possible implementation, if the operation position of the operation performed by the user is within the comment area, it is determined that the current operation is the commenting behavior. In this case, as shown in FIG. 4, step 208 may include the following steps 301 to 303.

In step 301, comment information is received.

In the embodiment, if the operation position of the operation performed by the user is within the comment area, it is determined that the operation with the operation position in the comment area is the commenting behavior, and in this case, the electronic device may receive the comment information inputted by the user.

In step 302, a display position of the comment information is determined based on the operation position.

Specifically, it may be first determined whether there is historical comment information at the operation position. If there is historical comment information at the operation position, the comment information is added as a comment reply to the historical comment information; and if there is no historical comment information at the operation position, the comment information is displayed at the operation position.

By adding the comment information as a comment reply to the historical comment information if there is historical comment information at the operation position, the user can easily reply and communicate, and the user can comment on and reply to the historical comment without selecting the to-be-replied historical comment information, improving the convenience of commenting and replying.

In step 303, the comment information is displayed at the display position.

In the embodiment, after the display position of the comment information is determined, the comment information inputted by the user may be displayed at the display position.

For example, if the obtained operation position matches the position of the default comment area, the comment information inputted by the user may be displayed below the document, and if there is an existing comment below the document, the comment information is displayed below the existing comment.

For example, if the obtained operation position coincides with the position of an added annotation, and there is an existing comment in the annotation, the comment content inputted by the user is added as a reply to the existing comment, and if there is no comment in the annotation, the comment information inputted by the user is displayed in the annotation.

By determining the display position of the comment information based on the operation position and displaying received comment information at the display position, the user can easily perform comment operation, improving the convenience of the operation.

Figure 5:
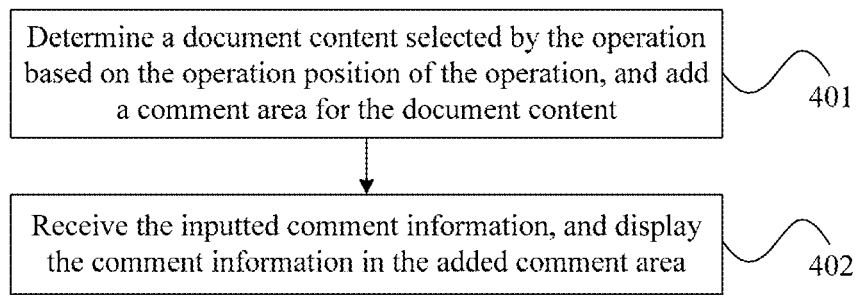
FIG. 5 is a flow chart showing a method for receiving and displaying comment information on a second document according to another embodiment of the present disclosure.

As a possible implementation, if the operation position is not within the comment area, and the operation attribute is the preset comment attribute, it is determined that the current operation is the commenting behavior. In this case, as shown in FIG. 5, step 208 may include the following steps 401 and 402.

In step 401, a document content selected by the operation is determined based on the operation position of the operation, and a comment area is added for the document content.

The added comment area is arranged in a sidebar of the display interface, and the sidebar is adjacent to an area for displaying the second document in a longitudinal direction.

In the embodiment, when it is determined that the operation currently performed by the user is the commenting behavior, the document content selected by the operation may be further determined based on the operation position of the operation, and the comment area is added for the document content.

Figure 6:
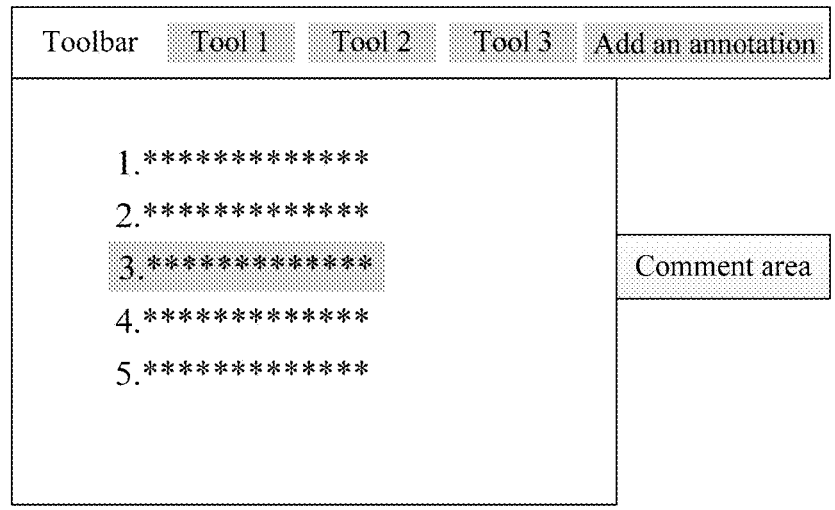
FIG. 6 is a schematic diagram showing an example of a newly added comment area.

For example, as shown in FIG. 6, a toolbar may be set above the online document, and a tool "Add an annotation" for adding an annotation is provided in the toolbar. In FIG. 6, multiple pieces of content are displayed in the second document. After the user selects the third piece of content and clicks the tool "Add an annotation" in the toolbar, the electronic device may determine that the operation performed by the user is the commenting behavior, determine the operation position based on the operation of selecting performed by the user, and further determine the content selected by the user based on the operation position, and then add a comment area on the right side of the selected content. The user may input comment information in the newly added comment area.

In step 402, inputted comment information is received, and the comment information is displayed in the added comment area.

In the embodiment, after the comment area is added, the user may input comment information for the document content. The electronic device receives the input performed by the user, and displays the received comment information in the added comment area.

The operation attribute of the operation is obtained to determine whether the operation is the commenting behavior if the operation position is not within the comment area, the document content selected by the user is determined based on the operation position of the operation if the operation is the commenting behavior, the comment area is added for the document content, and the received comment information is displayed in the added comment area, such that the user can easily perform comment operation, and can add comment information at any time based on the content being browsed without having to find an input box at a specific location, facilitating operation of the user, and improving the convenience of the operation.

Further, in a possible implementation of an embodiment of the present disclosure, after the comment information inputted by the user is displayed in the added comment area, the electronic device may further receive a first instruction for hiding the added comment area, hide the added comment area, and set a hide icon for the hidden comment area; and the electronic device may receive a second instruction for expanding the added comment area, expand the added comment area, and cancel the hide icon, where the second instruction is generated when the hide icon is clicked.

Figure 7:
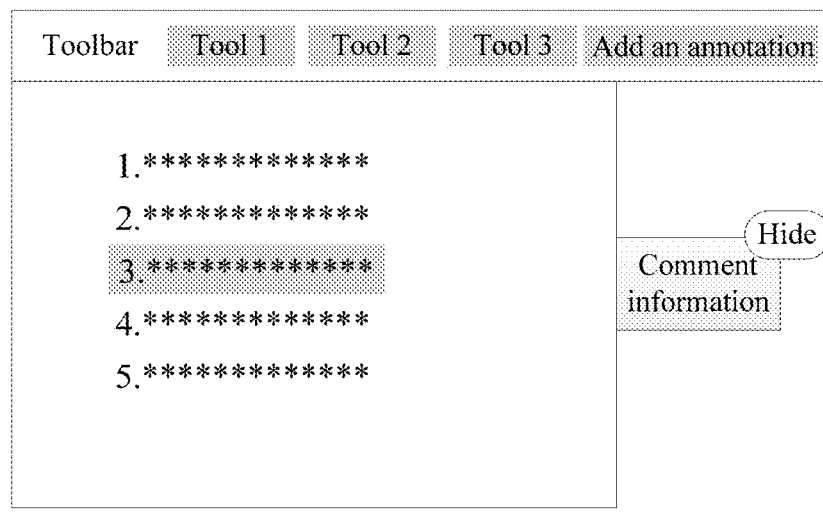
FIG. 7(*a*) is a schematic diagram showing an example of setting a hide button in a newly added comment area.
Figure 7:
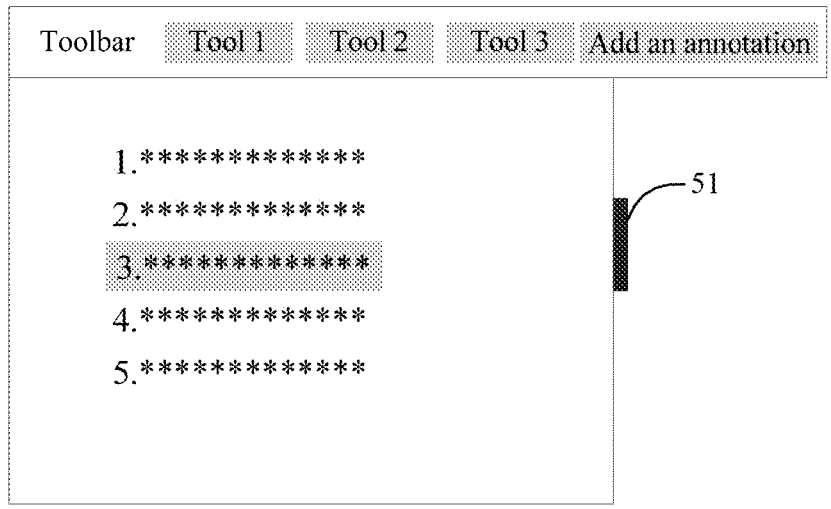

For example, as shown in FIG. 7(a), a button "Hide" is provided on the upper right corner of the comment area in which the comment information inputted by the user is displayed. When the user triggers the button, the corresponding comment area is hidden, as shown in FIG. 7(b). The hidden comment area is displayed in a form of the hide icon, as indicated by 51 in FIG. 7(b), where 51 indicates the hide icon. When the user clicks the hide icon 51, the comment area is displayed, and the hide icon is canceled, such that the display state as shown in FIG. 7(a) is restored.

By setting the comment area to be hidden or displayed, the user can select to display the added comment area or to hide the added comment area as required, thereby improving the flexibility of the user operation.

The method for commenting on an online document is provided according to the embodiment. The operation position of the operation is obtained. It is determined that the operation with the operation position within the comment area is the commenting behavior if the operation position is within the comment area. If the operation position is not within the comment area, the operation attribute of the operation is obtained to determine whether the operation is the commenting behavior. It is determined that the operation is the commenting behavior if the operation attribute is the preset comment attribute. The format of the first document is obtained when the commenting behavior is identified. In this way, the commenting behavior performed by the user can be accurately identified, providing a basis for determining whether the format of the first document is to be further obtained.

Figure 8:
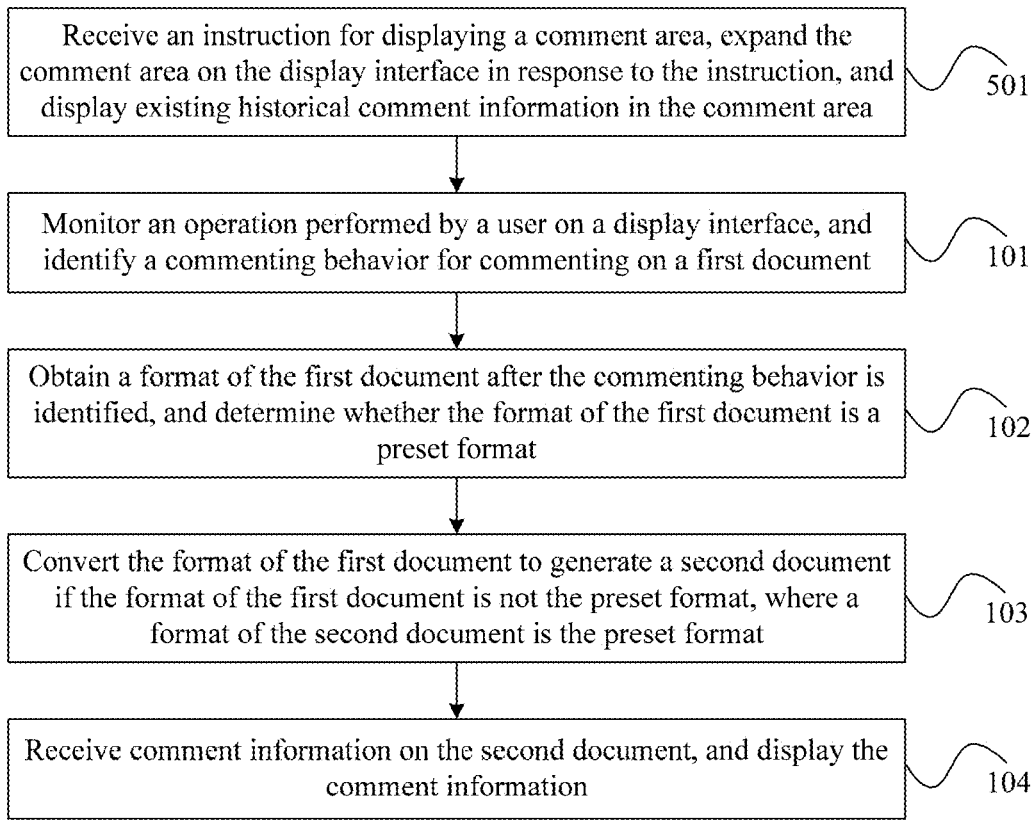
FIG. 8 is a flow chart showing a method for commenting on an online document according to another embodiment of the present disclosure.

Further, in a possible implementation of an embodiment of the present disclosure, as shown in FIG. 8, based on the embodiment shown in FIG. 1, before step 101, the method may further include the following step S501.

In step S501, an instruction for displaying a comment area is received, the comment area is expanded on the display interface in response to the instruction, and existing historical comment information in the comment area is displayed.

In the embodiment, a button for displaying the comment area may be set on the display interface of the first document. When the button is triggered, the electronic device may receive the instruction for displaying the comment area, expand the comment area on the display interface in response to the instruction, and display existing historical comment information in the comment area.

For example, a button "Display existing comment" may be set on the right side of the title of the first document. When the user clicks the button, the button is triggered, and the electronic device may receive the instruction for displaying the comment area. Thereafter, the electronic device displays the comment area on the display interface, and displays all existing historical comment information in the comment area.

With the method for commenting on an online document according to the embodiment, by receiving the instruction for displaying the comment area, expanding the comment area in response to the instruction, and displaying existing historical comment information in the comment area. The user can determine whether to display a comment based on needs, such that the user can easily control the display of the existing comment, and the controllability of the display of the comment content and the flexibility of the user operation can be improved.

In order to implement the above embodiments, an apparatus for commenting on an online document is provided according to the present disclosure.

Figure 9:
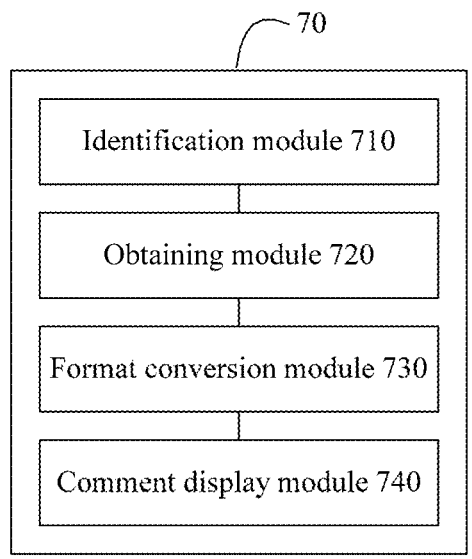
FIG. 9 is a schematic structural diagram showing an apparatus for commenting on an online document according to an embodiment of the present disclosure.

FIG. 9 is a schematic structural diagram showing an apparatus for commenting on an online document according to an embodiment of the present disclosure.

As shown in FIG. 9, the apparatus 70 for commenting on an online document includes: an identification module 710, an obtaining module 720, a format conversion module 730, and a comment display module 740.

The identification module 710 is configured to monitor an operation performed by a user on a display interface, and identify a commenting behavior for commenting on a first document.

The obtaining module 720 is configured to obtain a format of the first document when the commenting behavior is identified, and determine whether the format of the first document is a preset format.

The format conversion module 730 is configured to convert the format of the first document to generate a second document if the format of the first document is not the preset format, where a format of the second document is the preset format.

Specifically, the format conversion module 730 is configured to perform optical character recognition (OCR) on the first document and generate the second document by using a recognition result if the format of the first document is an image format, perform speech recognition on the first document and generate the second document by using a recognized text if the format of the first document is an audio format, and perform text format conversion on the first document to generate the second document if the format of the first document is a non-editable text format.

The comment display module 740 is configured to receive comment information on the second document and display the comment information.

Figure 10:
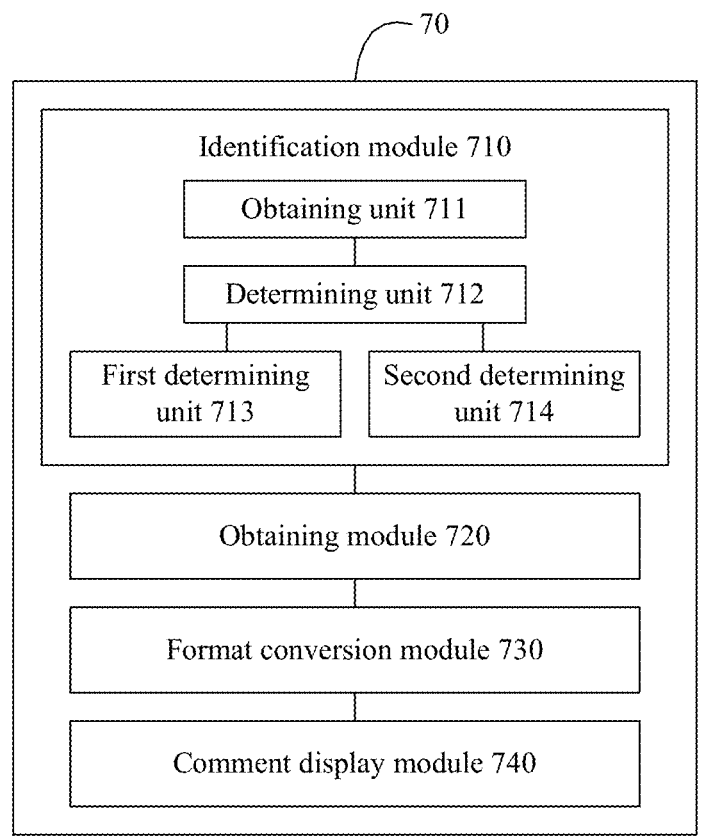
FIG. 10 is a schematic structural diagram showing an apparatus for commenting on an online document according to another embodiment of the present disclosure.

Further, in a possible implementation of an embodiment of the present disclosure, as shown in FIG. 10, based on the embodiment shown in FIG. 9, the identification module 710 includes: an obtaining unit 711, a determining unit 712, a first determining unit 713, and a second determining unit 714.

The obtaining unit 711 is configured to monitor the operation performed by the user on the display interface and obtain an operation position of the operation.

The determining unit 712 is configured to determine whether the operation position is within a comment area.

The comment area includes a default comment area and a comment area added in a form of an annotation. The default comment area has a fixed position, such as on the lower right corner of a document.

The first determining unit 713 is configured to determine that, if the operation position is within the comment area, the operation with the operation position within the comment area is the commenting behavior.

The second determining unit 714 is configured to obtain an operation attribute of the operation if the operation position is not within the comment area, and if the operation attribute of is a preset comment attribute, determine that the operation with the operation attribute being the preset comment attribute is the commenting behavior.

In a possible implementation of an embodiment of the present disclosure, the comment display module 740 is configured to, after the first determining unit 713 determines that the operation with the operation position within the comment area is the commenting behavior, receive comment information, and determine a display position for the comment information based on the operation location, and display the comment information at the display position.

Specifically, the comment display module 740 may be configured to, when determining the display position for the comment information based on the operation location, determine whether there is historical comment information at the operation position. If there is historical comment information at the operation position, the comment display module 740 adds the comment information as a comment reply to the historical comment information; and if there is no historical comment information at the operation position, the comment display module 740 displays the comment information at the operation position. Therefore, it is convenient for the user to reply and communicate, and the user can comment on and reply to the historical comment without selecting the to-be-replied historical comment information, improving the convenience of commenting and replying.

By determining the display position for the comment information based on the operation position and displaying received comment information at the display position, the user can easily perform comment operation, improving the convenience of the operation.

In a possible implementation of an embodiment of the present disclosure, the comment display module 740 is configured to, when the second determining unit 714 determines that the operation with the operation attribute being the preset comment attribute is the commenting behavior, determine a document content selected by the operation based on the operation position of the operation, add a comment area for the document content, receive the inputted comment information, and display the comment information in the added comment area, where the added comment area is arranged in a sidebar of the display interface, and the sidebar is adjacent to an area for displaying the second document in a longitudinal direction.

By obtaining the operation attribute of the operation to determine whether the operation is the commenting behavior if the operation position is not within the comment area, determining the document content selected by the user based on the operation position of the operation if the operation is the commenting behavior, adding the comment area for the document content, and displaying the received comment information in the added comment area, the user can easily perform comment operation, and can add comment information at any time based on the content being browsed without having to find an input box at a specific location, facilitating operation of the user, and improving the convenience of the operation.

Further, the comment display module 740 is further configured to, after displaying the comment information in the added comment area, receive a first instruction for hiding the added comment area, hide the added comment area, and set a hide icon for the hidden comment area. The comment display module 740 is further configured to receive a second instruction for expanding the added comment area, expand the added comment area, and cancel the hide icon, where the second instruction is generated when the hide icon is clicked.

By setting the comment area to be hidden or displayed, the user can select to display the added comment area or hide the added comment area as required, thereby improving the flexibility of the user operation.

The operation position of the operation is obtained. It is determined that the operation with the operation position within the comment area is the commenting behavior if the operation position is within the comment area. If the operation position is not within the comment area, the operation attribute of the operation is obtained to determine whether the operation is the commenting behavior. It is determined that the operation is the commenting behavior if the operation attribute is the preset comment attribute. The format of the first document is obtained when the commenting behavior is identified. In this way, the commenting behavior performed by the user can be accurately identified, providing a basis for determining whether the format of the first document is to be further obtained.

Figure 11:
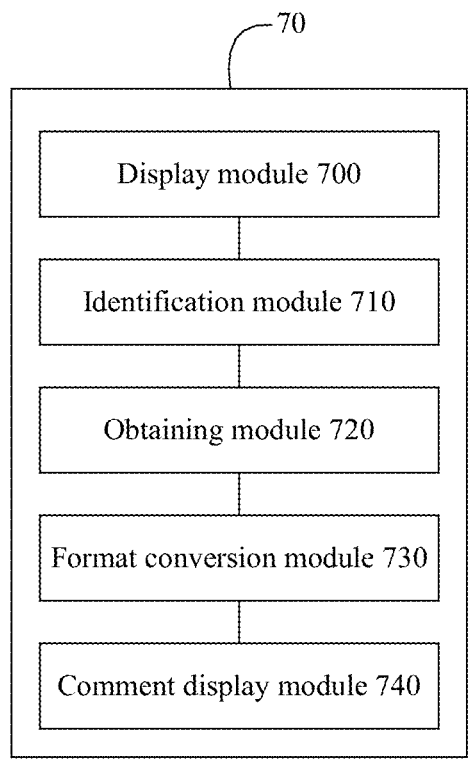
FIG. 11 is a schematic structural diagram showing an apparatus for commenting on an online document according to another embodiment of the present disclosure.

In a possible implementation of an embodiment of the present disclosure, as shown in FIG. 11, based on the embodiment shown in FIG. 9, the apparatus 70 for commenting on an online document includes a display module 700.

The display module 700 is configured to receive an instruction for displaying a comment area, and expand the comment area on the display interface in response to the instruction, and display existing historical comment information in the comment area.

By receiving the instruction for displaying the comment area, expanding the comment area in response to the instruction, and displaying existing historical comment information in the comment area, the user can select whether to display a comment according to requirements, such that the user can easily control the display of the existing comment, and the controllability of the display of the comment content and the flexibility of the user operation can be improved.

It should be noted that the foregoing description of the method for commenting on an online document is also applicable to the apparatus for commenting on an online document in the embodiment, the implementation principle thereof is similar, and details are not described herein again.

With the apparatus for commenting on an online document according to the embodiment of the present disclosure, the commenting behavior for commenting on the first document is identified by monitoring the operation performed by the user on the display interface, the format of the first document is obtained when the commenting behavior is identified, it is determined whether the format of the first document is the preset format. The format of the first document is converted to obtain the second document in the preset format if the format of the first document is not the preset format, then comment information on the second document is received and displayed. Therefore, comment information is received and displayed when the comment behavior is detected, and the comment information is displayed only after the user comments on the document, in order to provide a commenting function for the online document, and to display the comment information to only the user with commenting needs. The comment information is not displayed to the user without commenting needs, thereby improving the flexibility of displaying a comment in the online document, such that the comment information is displayed in a targeted manner, thereby enhancing the user's reading experience.

In order to implement the above embodiments, an electronic device is provided according to the present disclosure.

Figure 12:
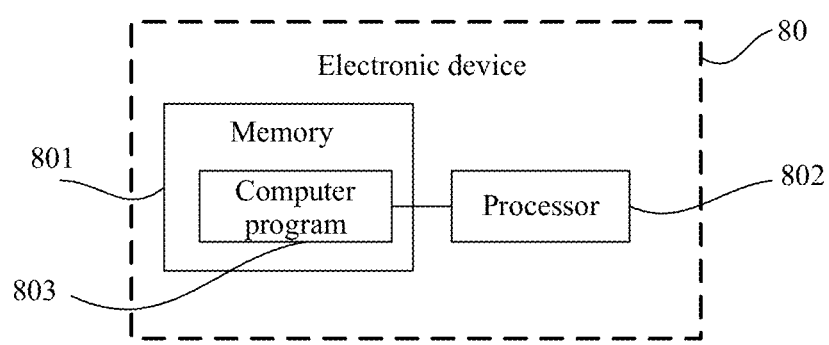
FIG. 12 is a schematic structural diagram showing an electronic device according to an embodiment of the present disclosure.

FIG. 12 is a schematic structural diagram showing an electronic device according to an embodiment of the present disclosure. As shown in FIG. 12, the computer device 80 includes a memory 801, a processor 802, and a computer program 803 stored in the memory 801 and executable by the processor 802. When the processor 802 executes the computer program 803, the method for commenting on an online document as described in the foregoing embodiments is performed.

Figure 13:
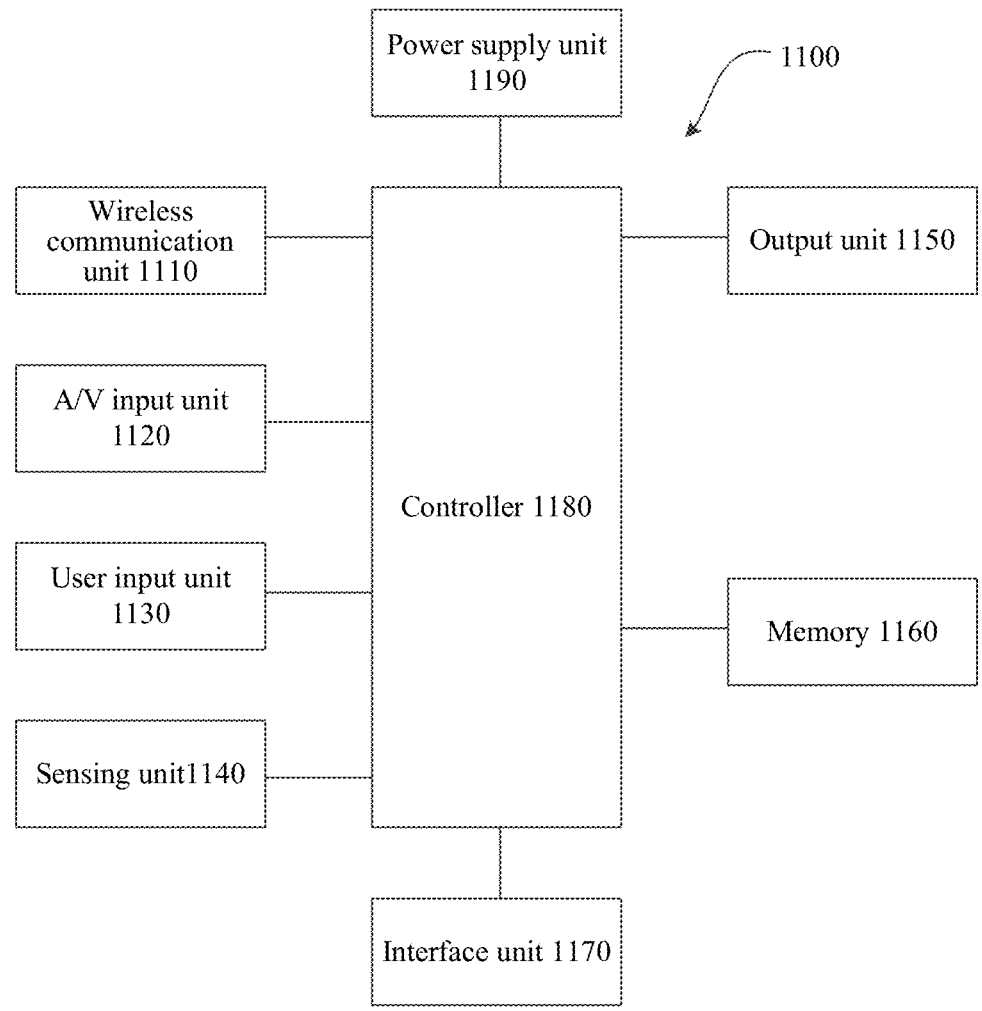
FIG. 13 is a schematic hardware structural diagram showing an electronic device according to an embodiment of the present disclosure.

FIG. 13 is a schematic hardware structural diagram showing an electronic device according to an embodiment of the present disclosure. The electronic device may be implemented in various forms. According to the present disclosure, the electronic device may include, but is not limited to, a mobile terminal device such as a mobile phone, a smart phone, a notebook computer, a digital broadcast receiver, a PDA (personal digital assistant), a PAD (tablet computer), a PMP (portable multimedia player), a navigation device, a vehicle terminal device, a vehicle display terminal, an a vehicle electronic rearview mirror, and a fixed terminal device such as a digital TV and a desktop computer.

As shown in FIG. 13, the electronic device 1100 may include a wireless communication unit 1110, an A/V (audio/video) input unit 1120, a user input unit 1130, a sensing unit 1140, an output unit 1150, a memory 1160, an interface unit 1170, a controller 1180, and a power supply unit 1190. A terminal device having various components is shown in FIG. 13. It should be understood that not all the shown components are required to be implemented. More or less components may be implemented alternatively.

The wireless communication unit 1110 is configured to provide a radio communication between the electronic device 1100 and a wireless communication system or network. The A/V input unit 1120 is configured to receive an audio or video signal. The user input unit 1130 is configured to generate key input data based on a command inputted by the user to control various operations of the electronic device. The sensing unit 1140 is configured to detect a current state of the electronic device 1100, a position of the electronic device 1100, whether the user performs an input operation by touch on the electronic device 1100, an orientation of the electronic device 1100, and an acceleration or deceleration movement and direction of the electronic device 1100, and generate a command or signal for controlling the operation of the electronic device 1100. The interface unit 1170 is configured to serve as an interface through which at least one external device may connect with the electronic device 1100. The output unit 1150 is configured to provide an output signal in a visual, audio, and/or tactile manner. The memory 1160 is configured to store a software program of processing and operations which are performed and controlled by the controller 1180, or temporarily store data that has been outputted or is to be outputted. The memory 1160 may include at least one type of storage medium. Moreover, the electronic device 1100 may cooperate with a network storage device that performs a storage function of the memory 1160 via a network connection. The controller 1180 is configured to control the overall operation of the terminal device. In addition, the controller 1180 may include a multimedia module for reproducing or playing back multimedia data. The controller 1180 may be configured to perform a pattern recognition process to recognize a handwriting input or a picture drawing performed on a touch screen as a character or an image. The power supply unit 1190 is configured to receive external power or internal power under the control of the controller 1180 and provide appropriate power required for the operations of various elements and components.

Various embodiments of the method for commenting on an online document according to the present disclosure may be implemented by using a computer readable medium, such as computer software, hardware, or any combination thereof. For implementation by hardware, various embodiments of the method for commenting on an online document according to the present disclosure may be implemented by using at least one of electronic units performing the described functions, where the electronic units includes an application specific integrated circuit (ASIC), a digital signal processor (DSP), a digital signal processing device (DSPD), a programming logic device (PLD), a field programmable gate array (FPGA), a processor, a controller, a microcontroller, and a microprocessor. In some cases, various embodiments of the method for commenting on an online document according to the present disclosure may be implemented in the controller 1180. For implementation by software, various embodiments of the method for commenting on an online document according to the present disclosure may be implemented by a single software module which may perform at least one function or operation. The software code may be implemented by a software application program (or program) written in any suitable programming language, and the software code may be stored in the memory 1160 and executed by the controller 1180.

In order to implement the above embodiments, a non-transitory computer readable storage medium is provided according to the present disclosure. The non-transitory computer readable storage medium stores a computer program, and when the computer program is executed by a processor, the method for commenting on an online document as described in the foregoing embodiments is performed.

Figure 14:
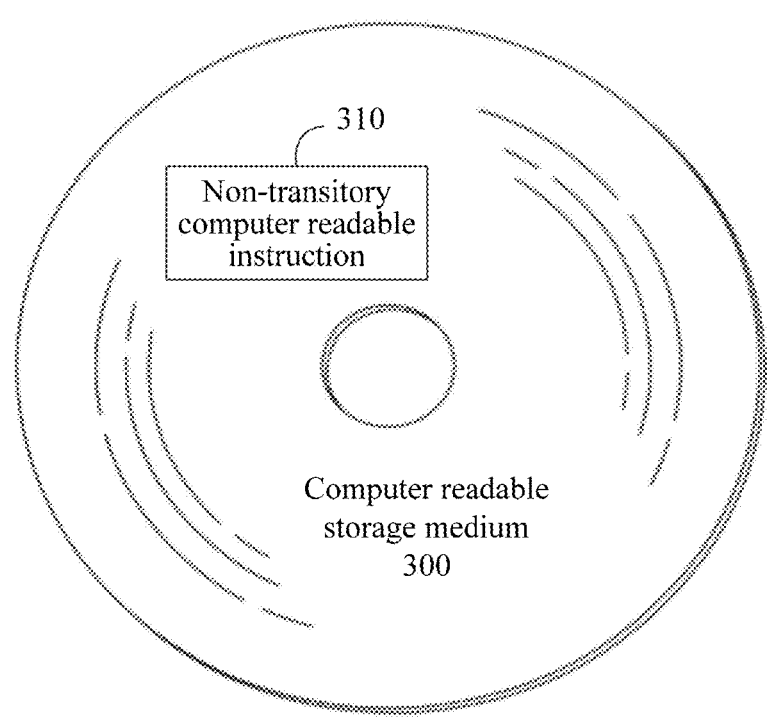
FIG. 14 is a schematic diagram showing a computer readable storage medium according to an embodiment of the present disclosure.

FIG. 14 is a schematic diagram showing a computer readable storage medium according to an embodiment of the present disclosure. As shown in FIG. 14, the computer readable storage medium 300 according to the embodiment of the present disclosure stores a non-transitory computer readable instruction 310. When the non-transitory computer readable instruction 310 is executed by the processor, all or part of the steps of the method for commenting on an online document as described in the foregoing embodiments of the present disclosure are performed.

In order to implement the above embodiments, a computer program product is provided according to the present disclosure. When instructions in the computer program product are executed by a processor, the method for commenting on an online document as described in the foregoing embodiments is performed.

In the description of the present specification, the description with reference to the terms "one embodiment", "some embodiments", "example", "specific example", or "some examples" means that a specific feature, structure, material, or characteristic described in connection with the embodiment or example is included in at least one embodiment or example of the present disclosure. In the present specification, an illustrative representation of the above terms need not refer to the same embodiment or example. Furthermore, the particular features, structures, materials, or characteristics described may be combined in any suitable manner in one or more embodiments or examples. In addition, those skilled in the field may combine the various embodiments or examples described herein and the features thereof without contradiction.

In addition, the terms "first" and "second" are used for purpose of description, and should not be interpreted as indicating or implying relative importance or implying the number of the indicated technical features. Thus, features defining "first" or "second" may explicitly or implicitly include at least one of the features. In the description of the present disclosure, the meaning of "a plurality" is at least two, such as two or three, unless specifically defined otherwise.

Any process or method described in the flowchart or in other manners herein should be understood as representing modules, segments, or portions of code which include one or more executable instructions for implementing specific logical functions or steps in the process, and alternate implementations are included in the scope of the preferred embodiment of the present disclosure in which functions may be executed out of order from that shown or discussed, including substantially concurrently or in reverse order, depending on the functionality involved, as would be understood by those skilled in the art of the present disclosure.

Logic and/or steps described in the flowchart or other manners herein, for example, may be provided by an ordered listing of executable instructions that can be embodied in any computer-readable medium for use by or in connection with an instruction execution system, apparatus, or device (such as a computer-based system, processor-containing system, or other system that can fetch the instructions from the instruction execution system, apparatus, or device and execute the instructions). For the specification, "the computer readable medium" may be any device which may include, store, communicate with, spread or transfer a program to be used for the instruction execution system, the device or the equipment or in conjunction with the instruction execution system, the device or the equipment. Specific examples of the computer readable medium (an non-exhaustive list) includes: an electrical connection part having one or more wiring (an electronic device), a portable computer enclosure (magnetic device), a random access memory (RAM), a read only memory (ROM), an erasable editable read only memory (EPROM or a flash memory), a fiber-optic device and a portable compact disc read only memory (CDROM). In addition, the computer readable medium may also be a paper or other suitable medium on which the program is be printed, since optical scanning can be performed on the paper or the other medium, and the program can be obtained in an electronic manner by editing, translating or processing, or in other suitable way when necessary, and is stored in the memory of the computer.

It should be understood that each part of the present disclosure can be implemented with hardware, software, firmware or a combination thereof. In the embodiments described above, multiple steps or methods are implemented with the software or the firmware, stored in the memory, executed by a suitable instruction execution system. For example, if implemented in hardware and in another embodiment, it can be implemented using any one or combination of the following techniques well known in the field: a discrete logic circuit having logic gates for implementing logic functions on data signals, an application specific integrated circuit with suitable combinational logic gates, a programmable gate array (PGA), and a field programmable gate array (FPGA).

Those skilled in the field will appreciate that all or some of the steps of the methods in the above embodiments may be achieved by a program instructing relevant hardware, where the program may be stored in a computer readable storage medium, and may include one of the steps of the method embodiment or a combination thereof when executed.

In addition, all function units according to the embodiment of the present disclosure may be integrated into one processing unit, or may be a physically separate unit, or may be one unit that is integrated by two or more units. The above integrated module can be realized in the form of hardware or software function module. The integrated modules may also be stored in a computer-readable storage medium if implemented in the form of software function modules and sold or used as standalone products.

The storage medium referred above may be a read only memory, a magnetic disk, or an optical disk. Although the embodiments of the present disclosure have been illustrated and described above, it should be understood that the embodiments described above are only exemplary, and are not understood as limitation for the present disclosure. Changes, modifications, substitutions and alternations can be made on the embodiments described above by those skilled in the filed within the scope of the present disclosure.

The invention claimed is:

1. A method for commenting on an online document, comprising:
    monitoring an operation performed by a user on a display interface, and identifying a behavior indicative of an intent to comment on a first document;
    in response to identifying the behavior indicative of the intent to comment on the first document, obtaining a format of the first document and determining whether the format of the first document is a preset format;
    in response to determining that the format of the first document is not the preset format, converting the format of the first document and generating a second document, wherein a format of the second document is the preset format;
    receiving comment information on the second document, and displaying the comment information;
    wherein the method further comprises:
    obtaining an operation position of the operation performed by the user;
    determining whether the operation position is within a comment area; and
    determining a display position of the comment information based on the operation position when the operation position is within the comment area, wherein the determining a display position of the comment information based on the operation position further comprise:
        determining whether there is historical comment information at the operation position,
        adding the comment information as a comment reply to the historical comment information when there is historical comment information at the operation position, and
        displaying the comment information at the operation position when there is no historical comment information at the operation position.

2. The method according to claim 1, wherein the converting the format of the first document to generate a second document comprises:
    when the format of the first document is an image format, performing optical character recognition OCR on the first document, and generating the second document by using a recognition result; or
    when the format of the first document is an audio format, performing speech recognition on the first document, and generating the second document by using a recognized text; or
    when the format of the first document is a non-editable text format, performing text format conversion on the first document, to generate the second document.

3. The method according to claim 1, wherein the identifying a commenting behavior for commenting on a first document comprises:
    determining that the operation with the operation position in the comment area is the commenting behavior;
    obtaining an operation attribute of the operation when the operation position is not within the comment area; and
    when the operation attribute is a preset comment attribute, determining that the operation with the operation attribute being the preset comment attribute is the commenting behavior.

4. The method according to claim 1, wherein the receiving comment information on the second document and displaying the comment information comprises:
    determining a document content selected by the operation based on the operation position of the operation, and adding a comment area for the document content, wherein the added comment area is arranged in a sidebar of the display interface, and the sidebar is adjacent to an area for displaying the second document in a longitudinal direction;
    receiving the comment information that is inputted; and
    displaying the comment information in the added comment area.

5. The method according to claim 4, wherein after displaying the comment information in the added comment area, the method further comprises:

receiving a first instruction for hiding the added comment area, hiding the added comment area, and setting a hide icon for the hidden comment area; and receiving a second instruction for expanding the added comment area, expanding the added comment area, and canceling the hidden icon, wherein the second instruction is generated when the hide icon is clicked.

6. The method according to claim 1, further comprising: displaying the comment information at the display position.

7. The method according to claim 1, wherein before the monitoring an operation performed by a user on a display interface, the method further comprises:

receiving an instruction for displaying a comment area, and expanding the comment area on the display interface in response to the instruction, and displaying existing historical comment information in the comment area.

8. An apparatus for commenting on an online document, comprising:

at least one processor; and at least one memory communicatively coupled to the at least one processor and storing instructions that upon execution by the at least one processor cause the apparatus to:

monitor an operation performed by a user on a display interface, and identify a behavior indicative of an intent to comment on a first document;

in response to identifying the behavior indicative of the intent to comment on the first document, obtain a format of the first document, and determine whether the format of the first document is a preset format;

in response to determining that the format of the first document is not the preset format, convert the format of the first document and generate a second document, wherein a format of the second document is the preset formal;

receive comment information on the second document and display the comment information;

wherein the at least one memory further stores instructions that upon execution by the at least one processor cause the apparatus to:

obtain an operation position of the operation performed by the user;

determine whether the operation position is within a comment area; and determine a display position of the comment information based on the operation position when the operation position is within the comment area, wherein determining a display position of the comment information based on the operation position further comprise:

determining whether there is historical comment information at the operation position, adding the comment information as a comment reply to the historical comment information when there is historical comment information at the operation position, and displaying the comment information at the operation position when there is no historical comment information at the operation position.

9. The apparatus according to claim 8, wherein the at least one memory further stores instructions that upon execution by the at least one processor cause the apparatus to:

when the format of the first document is an image format, perform optical character recognition OCR on the first document and generate the second document by using a recognition result; or when the format of the first document is an audio format, perform speech recognition on the first document and generate the second document by using a recognized text; or when the format of the first document is a non-editable text format, perform text format conversion on the first document to generate the second document.

10. The apparatus according to claim 8, wherein the at least one memory further stores instructions that upon execution by the at least one processor cause the apparatus to:

determine, when the operation position is in the comment area, that the operation with the operation position in the comment area is the commenting behavior; and obtain an operation attribute of the operation when the operation position is not within the comment area, and determine, when the operation attribute is a preset comment attribute, that the operation with the operation attribute being the preset comment attribute is the commenting behavior.

11. The apparatus according to claim 8, wherein the at least one memory further stores instructions that upon execution by the at least one processor cause the apparatus to:

determine a document content selected by the operation based on the operation position of the operation, and add a comment area for the document content, wherein the added comment area is arranged in a sidebar of the display interface, and the sidebar is adjacent to an area for displaying the second document in a longitudinal direction;

receive the comment information that is inputted; and display the comment information in the added comment area.

12. The apparatus according to claim 8, wherein the at least one memory further stores instructions that upon execution by the at least one processor cause the apparatus to:

receive an instruction for displaying a comment area, and expand the comment area on the display interface in response to the instruction, and display existing historical comment information in the comment area.

13. A non-transitory computer readable storage medium, storing a computer program, wherein when the computer program is executed by a processor, cause the processor to perform operations, the operations comprising when the computer program is executed by a processor, cause the processor to perform operations, the operations comprising:

monitoring an operation performed by a user on a display interface, and identifying a behavior indicative of an intent to comment on a first document;

in response to identifying the behavior indicative of the intent to comment on the first document, obtaining a format of the first document and determining whether the format of the first document is a preset format;

in response to determining that the format of the first document is not the preset format, converting the format of the first document and generating a second document, wherein a format of the second document is the preset format;

receiving comment information on the second document, and displaying the comment information;

wherein the operations further comprise:

obtaining an operation position of the operation performed by the user;

determining whether the operation position is within a comment area; and determining a display position of the comment information based on the operation position when the operation position is within the comment area, wherein the determining a display position of the comment information based on the operation position further comprise:

determining whether there is historical comment information at the operation position, adding the comment information as a comment reply to the historical comment information when there is historical comment information at the operation position, and displaying the comment information at the operation position when there is no historical comment information at the operation position.

14. The apparatus according to claim 11, wherein the at least one memory further stores instructions that upon execution by the at least one processor cause the apparatus to:

receive a first instruction for hiding the added comment area, hiding the added comment area, and setting a hide icon for the hidden comment area; and receive a second instruction for expanding the added comment area, expanding the added comment area, and canceling the hidden icon, wherein the second instruction is generated when the hide icon is clicked.

15. The apparatus according to claim 8, wherein the at least one memory further stores instructions that upon execution by the at least one processor cause the apparatus to:

display the comment information at the display position.

* * * * *